United States Patent
Juretzka et al.

(12) 
(10) Patent No.: US 6,651,616 B1
(45) Date of Patent: Nov. 25, 2003

(54) METHOD FOR OPERATING A FOUR-STROKE RECIPROCATING INTERNAL COMBUSTION ENGINE WITH ALTERNATING COMPRESSION IGNITION AND EXTERNALLY SUPPLIED IGNITION

(75) Inventors: Andreas Juretzka, Stuttgart (DE); Rolf-Günther Nieberding, München (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/979,439

(22) PCT Filed: Apr. 1, 2000

(86) PCT No.: PCT/EP00/02936
§ 371 (c)(1),
(2), (4) Date: Feb. 15, 2002

(87) PCT Pub. No.: WO00/71875
PCT Pub. Date: Nov. 30, 2000

(30) Foreign Application Priority Data

May 21, 1999 (DE) .......................................... 199 23 413

(51) Int. Cl.$^7$ .............................. F02B 9/02; F02D 41/30
(52) U.S. Cl. ................ 123/305; 123/27 R; 123/568.21
(58) Field of Search ................................. 123/305, 295, 123/406.21, 406.23, 406.24, 406.26, 406.27, 406.29, 691, 568.21, 568.23, 568.24, 568.25, 568.26, 27 R, 323, 90.15–90.18

(56) References Cited

U.S. PATENT DOCUMENTS 6,105,550 A  *  8/2000 Nieberding ................. 123/294
6,276,334 B1 *  8/2001 Flynn et al. ................ 123/435

FOREIGN PATENT DOCUMENTS

| DE | 28 51 504 | 6/1980 |
| DE | 195 19 663 | 5/1996 |
| DE | 198 18 596 | 11/1999 |
| WO | 98/07973 | 2/1998 |

* cited by examiner

Primary Examiner—Henry C. Yuen
Assistant Examiner—Arnold Castro
(74) Attorney, Agent, or Firm—Kenyon & Kenyon

(57) ABSTRACT

In a method for the operation of a four-stroke reciprocating piston internal combustion engine with alternating compression. ignition and spark ignition, fuel is injected directly, fresh charge is delivered and combustion exhaust gas is led off. At low and medium partial load a partially homogenized, lean basic mixture of air, fuel and retained exhaust gas is formed for the compression ignition, and at higher partial load and at full load a homogeneous, stoichiometric mixture is formed for the spark ignition. Further features include exhaust gas retention, a build-up of exhaust gas and activation injection into the retained exhaust gas. For a smooth transition between the two operating modes, in addition to the co-ordinated interaction of exhaust gas retention, build up of exhaust gas, restriction of the fresh charge, and of the ignition advance angle in spark ignition, together with the quantity and the timing of the fuel injection, use is also made of exhaust gas recirculation.

9 Claims, 1 Drawing Sheet

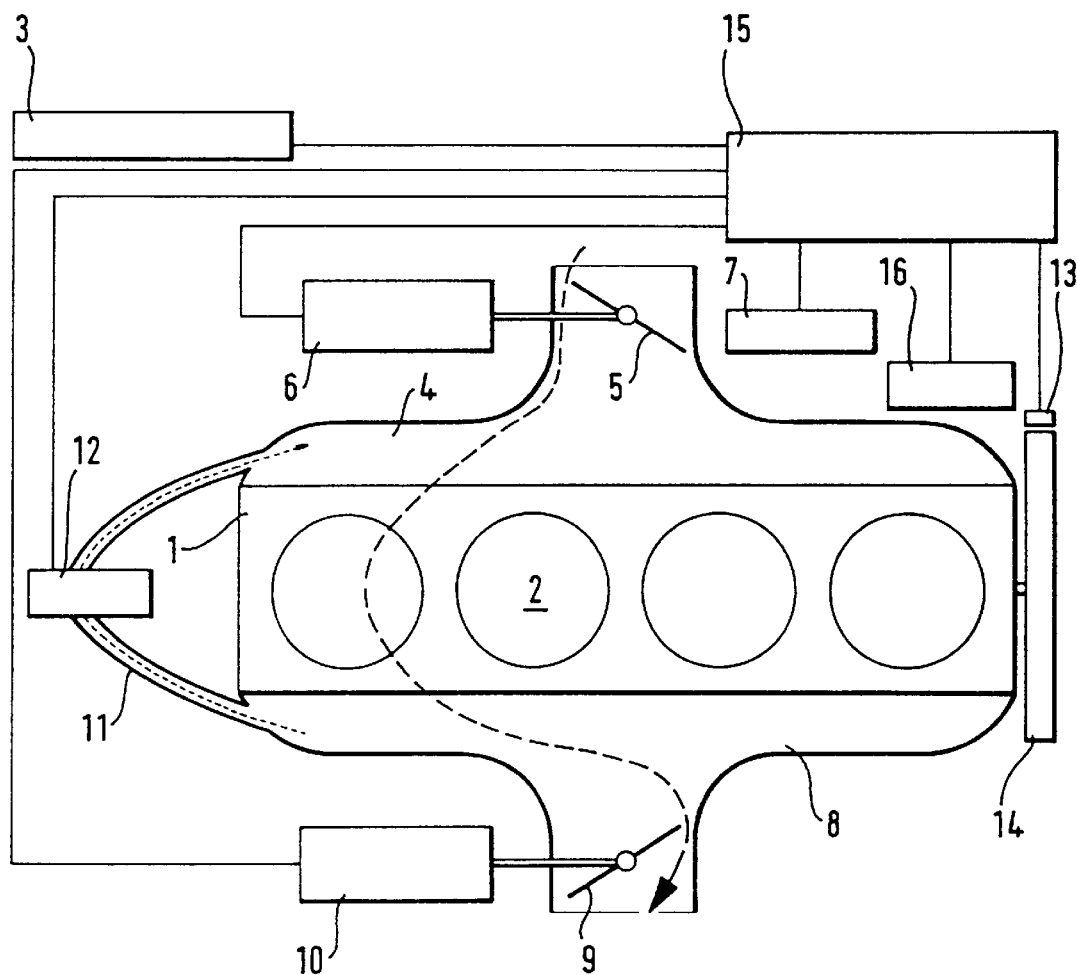

METHOD FOR OPERATING A FOUR-STROKE RECIPROCATING INTERNAL COMBUSTION ENGINE WITH ALTERNATING COMPRESSION IGNITION AND EXTERNALLY SUPPLIED IGNITION

FIELD OF THE INVENTION

The invention relates to a method for the operation of a four-stroke reciprocating piston internal combustion engine with alternating compression ignition and spark ignition.

BACKGROUND INFORMATION

A reciprocating piston internal combustion engine refers to an engine, which in a number of variable volumes burns mixtures of air and fuel and by way of the resulting gas pressure in the volumes converts the heat energy released into mechanical energy. The mixtures are formed by direct injection of the fuel inside the volumes functioning as combustion chambers.

When idling, at least, and/or at partial load the combustion is initiated by compression ignition. With partially homogenized, lean mixtures, this affords good potential for burning air-fuel mixtures with good efficiency and extremely low nitrogen oxide formation. With usual engine compression ratios, the compression ignition can only be operated with exhaust gas retention and exhaust gas activation. Exhaust gas activation means an activation injection of fuel into hot, compressed exhaust gas containing oxygen. Such ignition and combustion can only be achieved with stability in a narrow partial load characteristic curve range. For higher engine loads, the ignition and combustion of a spark ignition engine are required.

The variable operation of an internal combustion engine requires the facility for rapid adjustment of the engine load and a rapid transition between the two modes of operation. The direct, alternate transition between spark ignition and the combustion of high-energy, stoichiometric mixtures and the compression ignition of lean mixtures constitutes an abrupt change in the thermal and gas-dynamic conditions in the engine.

The compression ignition occurs through an increase in the temperature of the air-fuel mixture. The increase in the temperature of the fresh mixture is brought about by mixing with the exhaust gas fractions from the preceding cycle and by the ensuing geometric compression of the closed, maximum original volume to a minimal residual volume. In the remaining, compressed residual volume, a gas temperature is reached, which causes the mixture to ignite. The energy released by the combustion process ensuing from the compression ignition of homogeneous, lean mixtures makes it a self-sustaining or self-intensifying process. This combustion may be initiated and controlled through variable compression by variable inlet shut-off or by way of variable exhaust gas retention with activation injection. An increase in the load without knocking can be achieved by evaporative cooling through retarded fuel injection.

The combustion of the partially homogenized air-fuel mixture varies as a function of that proportion of the combustion chamber mass accounted for by retained exhaust gas with the excess air from the preceding cycle and the fresh air delivered together with the fuel introduced directly into the combustion chamber. The composition of the mixture at any given time affects the start and hence the process of energy release. A higher proportion of retained exhaust gas has an effect on the energy release in the subsequent cycle. Pilot control of the combustion is possible through specific injection as part of the activation.

For this purpose, the fuel is injected into the exhaust gas retained in the combustion chamber, thereby causing a mainly endothermic preliminary reaction of the fuel delivered by exhaust gas heat and hot residual air, which has an influence on the ensuing, compressed, full charge when the exothermic reaction is initiated.

International Published Patent Application No. WO 98/07973 describes an internal combustion engine, which can be operated by compression ignition and spark ignition, and describes in general terms how the combustion processes in the case of compression ignition can be registered and influenced. Combustion sequences ensuing from combustion are controlled by various control devices. For this purpose, feedback and open loop control elements are provided, which vary the compression ratio and the various mixture characteristics as a function of the load. Furthermore, the internal combustion engine has a control system for registering the combustion processes and for the detection of engine operating conditions such as the start of combustion and the duration of combustion, in order to generate corresponding engine operating condition signals. In the internal combustion engine, at low and medium load, combustion occurs due to compression ignition, and at higher loads due to spark ignition. Temperature, pressure, air ratio, mixture self-ignition control devices are controlled by corresponding control signals, in order to determine the ensuing combustion sequences. German Published Patent Application No. 198 18 596.0 describes a combustion engine, in which the mechanical concept required for practical implementation of the compression ignition in an engine is outlined. The necessary exhaust gas retention is achieved through a mechanical pilot control of a binary reversible camshaft, the reversed cam contour of which leads to shortened valve timings (valve interval) and hence to compression of the retained exhaust gas. The quantity of exhaust gas is controlled by way of an exhaust gas sensor flap, which is arranged downstream of the exhaust elements. The sensor flap controls the quantity of retained exhaust gas by way of the back pressure and the resulting pressure differential in relation to the combustion chamber.

In addition, an activation injection into the retained exhaust gas and a spark ignition for full load operation with stoichiometric mixture are also described.

In the case of valve timings with no exhaust gas retention, stoichiometric mixtures are ignited and combusted by spark ignition. In this case, the load is controlled by throttling of the stoichiometric mixture mass flow. In the combustion of a stoichiometric mixture, the exhaust gas has a high temperature. The efficiency of the engine with throttle control suffers from the throttle-induced losses.

The transitional range between compression ignition and spark ignition is the middle load range with throttle control. In operation with spark ignition, the engine load is controlled by way of the quantity of mixture using the inlet throttle valve, in the case of compression ignition via the quantity of exhaust gas using the exhaust gas sensor flap, since the latter determines the quantity of exhaust gas retained and hence the feasible fresh charge intake.

Combustion with spark ignition tolerates only a limited exhaust gas fraction in the air-fuel mixture. Operation with spark ignition is not possible in the camshaft position for exhaust gas retention. Conversely, operation with compression ignition of lean mixtures using the compression of spark ignition engines is likewise not possible without exhaust gas retention. In this case, the exhaust gas sensor flap alone is incapable of providing sufficient exhaust gas of corresponding temperature and activation.

It is an object of the present invention to provide a method for smooth, alternating transition between compression ignition and spark ignition in a combustion engine.

SUMMARY

This object is achieved by providing a method as described: herein.

The transition between the two modes of operation requires reversal of the cam contour and hence of the camshaft. The position of the camshaft is adjusted with the combustion engine running. This is best done during a single compression and expansion stroke, i.e., when the cams are not engaged. The reversal from compression ignition to spark ignition is then particularly easy to accomplish.

After reversal, the stoichiometric fuel quantity is injected into the fresh charge, the intake of which is initially unrestricted, and the mixture is then ignited by spark ignition. The unrestricted, stoichiometric mixture produces a large, high-energy charge, which leads to a considerably higher load in comparison to the operation with compression ignition of lean mixtures. While the pressure in the inlet manifold is falling due to throttling, this load may, for the same torque, be balanced by a continuous adjustment of the ignition advance angle.

One possible manner of changing very efficiently from compression ignition to spark ignition is by exhaust gas recirculation. While the exhaust gas back pressure is falling due to opening of the exhaust gas sensor flap, an exhaust gas recirculation valve is opened, which connects the intake area arranged downstream of the throttle valve to the exhaust area arranged upstream of the exhaust gas sensor flap. In this manner, as the excess pressure falls, exhaust gas is delivered to the still unrestricted induction stroke. The throttle valve is then closed far enough to enable the pressure differential between exhaust pipe and inlet manifold to deliver the quantity of exhaust gas that is necessary for optimum efficiency of the combustion using spark ignition. In this case, too, the engine load is controlled by the ignition advance angle for the same torque.

If the change from compression ignition to spark ignition extends over more than one operating cycle, the fuel feed is interrupted until the change is completed. This is followed by conventional starting with spark ignition. A short, controlled load pulse before and after the change-over compensates for the loss of power due to the non-firing operating cycles. At the same time, the inertia of the driveline prevents discernible variations in the speed.

In the transition from spark ignition to compression ignition, the exhaust gas from spark ignition is too hot for prolonged operation with a simple exhaust gas sensor flap. A heat-resistant design of the latter is very expensive. Due to the high exhaust gas temperature of the preceding stoichiometric combustion, a reduced exhaust gas retention is necessary for reactive initiation of the first compression ignition firings. Due to the lower combustion temperature in compression ignition of lean mixtures, the mean temperature in the combustion chamber falls, as a result of which the thermal load acting on the exhaust gas sensor flap diminishes and the requisite exhaust gas retention increases again until a stable operating condition of the compression ignition is attained.

In changing the method of ignition at low exhaust gas temperature, a combination of the characteristics of both methods of ignition is the desired aim. Preparation for the transition between the two methods of ignition takes the form of spark ignition combustion with high exhaust gas recirculation. Exhaust gas recirculation means that exhaust gas flows out of the combustion chamber through an exhaust element and back in through an inlet element. In the process, there is generally a considerable fall in the exhaust gas temperature. In order to accomplish both methods of ignition in one combustion chamber, the engine configuration may incorporate internal mixture formation and spark ignition. The internal mixture formation allows spark ignition and combustion with increased exhaust gas recirculation. The exhaust gas recirculation increases the mass flow through the combustion chamber, reduces the exhaust gas temperature and the formation of nitrogen oxides at medium load and affords an easier transition to compression ignition. The subsequent opening of the throttle on the inlet side and the reduction of the mean process temperature boost the engine efficiency.

BRIEF DESCRIPTION OF THE DRAWING

The FIGURE is a schematic view of an example embodiment of an internal combustion engine having four combustion chambers, a throttle valve, an exhaust gas sensor flap and an exhaust gas recirculation valve.

DETAILED DESCRIPTION

The FIGURE illustrates a four-stroke internal combustion engine, with a cylinder block 1, in which four combustion chambers 2 are arranged. The charge cycle occurs by way of inlet and exhaust elements, which are driven by a camshaft. The latter may be switched over by a switch 3 between the cam contour for valve overlap (operation with spark ignition) and the cam contour for exhaust gas retention (compression ignition mode).

The fresh charge is drawn in through an intake line 4, in which a throttle valve 5 common to all combustion chambers 2 is arranged, the valve being actuated by a throttle valve adjuster 6.

The fuel (e.g., petrol) is injected at high pressure into the combustion chambers 2 by injection valves, which are actuated by an injection unit 7. The exhaust gas is collected in an exhaust pipe 8, in which an exhaust gas sensor flap 9 common to all combustion chambers 2 is arranged. The flap is actuated by a sensor flap adjuster 10.

Between intake line 4 and exhaust pipe 8 is a connecting line 11, in which a controllable exhaust gas recirculation valve 12 is arranged.

A revolutions counter 13 registers the irregularity of the rotational movement of the crankshaft at the circumference of a flywheel 14. A computer 15, analyzing the speed fluctuations of the flywheel 14 and the measured values from any ion current probe present in the combustion chambers 2, controls the injection unit 7, the switch 3, the throttle valve adjuster 6, the sensor flap adjuster 10, the exhaust gas recirculation valve 12 and the ignition 16.

The method according to the invention is performed as follows.

The change-over between compression ignition and spark ignition is achieved by synchronous actuation of the throttle valve and exhaust gas sensor flap together with the exhaust gas recirculation (EGR) valve 12. The EGR valve 12 controls the connecting line 11, which is arranged between the exhaust pipe 8 upstream of the exhaust gas sensor flap 9 and the intake line 4 downstream of the throttle valve 5. As the engine load falls in increasingly throttled operation with spark ignition, the EGR valve 12 is opened. The pressure differential between intake line and exhaust pipe delivers exhaust gas into the fresh charge of the intake line 4. The combustion temperature falls and the pressure differential and hence the exhaust gas recirculation are increased proportionately by closing of the exhaust gas sensor flap 9.

Shortly before the camshaft is switched over to exhaust gas retention, the throttle valve 5 is opened, in order to reduce the pressure differential between exhaust pipe 8 and intake line 4, since exhaust gas recirculation is not required in the case of compression ignition. Such may be provided, however, in order to prevent knocking combustion in the case of low air-fuel ratios. The EGR valve 12 is normally closed immediately on switching over to exhaust gas retention.

What is claimed is:

1. A method for operating a four-stroke reciprocating piston internal combustion engine with alternating compression ignition and spark ignition, comprising the steps of:

directly injecting fuel into at least one combustion chamber, a volume of which varies cyclically;

delivering fresh charge air through at least one inlet element;

leading off combustion exhaust gas through at least one exhaust element;

forming a partially homogenized lean basic mixture of air, fuel and retained exhaust gas at a low and medium partial load;

performing compression ignition at partial load;

forming a homogeneous stoichiometric mixture at higher partial load and at full load;

performing spark ignition at full load;

performing exhaust gas retention due to controllable valve interval and build-up of exhaust gas;

performing activation injection into the retained exhaust gas;

forming a signal for a change of operating mode in accordance with exhaust gas retention of the exhaust gas build-up, restriction of the fresh charge, ignition advance angle in spark ignition, quantity and timing of fuel injection and exhaust gas recirculation;

changing-over between compression ignition and spark ignition by synchronous actuation of a throttle valve, an exhaust sensor flap and an exhaust gas recirculation valve; and controlling a connecting line by the exhaust gas recirculation valve, the connecting line arranged between an exhaust pipe upstream of the exhaust gas sensor flap and an intake line downstream of the throttle valve.

2. The method according to claim 1, wherein the changing-over step includes the substep of changing between valve interval and valve overlap in accordance with a displacement of a camshaft.

3. The method according to claim 1, wherein the changing-over step is performed over more than one operating cycle.

4. The method according to claim 3, further comprising the steps of:

shutting off the fuel injection during the changing-over step; and restarting the fuel injection in a new operating mode.

5. The method according to claim 3, further comprising the step of compensating for a fall in speed during the changing-over step by a load pulse.

6. The method according to claim 5, wherein the compensating step is performed after the changing-over step.

7. The method according to claim 2, further comprising the step of gradually closing a throttle valve and gradually opening an exhaust gas sensor flap and the exhaust gas recirculation valve when changing over from compression ignition to spark ignition after shifting the camshaft to valve overlap.

8. The method according to claim 7, further comprising the step of stoichiometrically adjusting the fuel injection quantity and adjusting an ignition advance angle to stabilize a torque after changing over from compression ignition to spark ignition.

9. The method according to claim 1, further comprising the step of gradually opening the throttle valve, gradually closing the exhaust gas sensor flap and maintaining the exhaust gas recirculation valve open, at least until spark ignition is switched off, when changing over from spark ignition to compression ignition after shifting a camshaft to valve interval.

* * * * *